United States Patent
Zalewski

(10) Patent No.: US 8,831,968 B2
(45) Date of Patent: Sep. 9, 2014

(54) DETERMINING WHETHER A COMMERCIAL TRANSACTION HAS TAKEN PLACE

(75) Inventor: Gary M. Zalewski, Oakland, CA (US)

(73) Assignee: Sony Computer Entertainment America, LLC, San Mateo, CA (US)

(*) Notice: Subject to any disclaimer, the term of this patent is extended or adjusted under 35 U.S.C. 154(b) by 501 days.

(21) Appl. No.: 12/184,968

(22) Filed: Aug. 1, 2008

(65) Prior Publication Data

US 2010/0030567 A1 Feb. 4, 2010

(51) Int. Cl.
  *G06Q 10/00* (2012.01)
  *G06Q 30/00* (2012.01)
  *G06Q 30/02* (2012.01)
  *G06Q 10/06* (2012.01)

(52) U.S. Cl.
  CPC .......... *G06Q 30/02* (2013.01); *G06Q 30/0261* (2013.01); *G06Q 30/0241* (2013.01); *G06Q 10/063* (2013.01)
  USPC .................... 705/7.29; 705/14.41; 705/14.49; 705/14.58

(58) Field of Classification Search
  CPC  G06Q 30/02; G06Q 30/0241; G06Q 30/0261
  USPC ....................... 705/7.29, 14.41, 14.49, 14.58
  See application file for complete search history.

(56) References Cited

U.S. PATENT DOCUMENTS

| | | | |
|---|---|---|---|
| 5,974,396 A * | 10/1999 | Anderson et al. ............ | 705/7.33 |
| 7,703,114 B2 | 4/2010 | Thukral | |
| 2002/0102993 A1 | 8/2002 | Hendrey et al. | |
| 2002/0161651 A1 * | 10/2002 | Godsey et al. .................. | 705/22 |
| 2003/0018966 A1 | 1/2003 | Cook et al. | |
| 2003/0039379 A1 * | 2/2003 | Gutta et al. .................... | 382/116 |
| 2003/0154126 A1 * | 8/2003 | Gehlot et al. .................. | 705/14 |
| 2003/0208754 A1 * | 11/2003 | Sridhar et al. .................. | 725/34 |
| 2003/0233276 A1 | 12/2003 | Pearlman et al. | |
| 2004/0114766 A1 * | 6/2004 | Hileman et al. .............. | 380/278 |
| 2005/0222906 A1 * | 10/2005 | Chen ............................... | 705/14 |
| 2005/0228718 A1 * | 10/2005 | Austin ............................ | 705/14 |
| 2006/0015404 A1 * | 1/2006 | Tran .............................. | 705/14 |
| 2007/0219866 A1 * | 9/2007 | Wolf et al. ..................... | 705/14 |
| 2007/0220545 A1 | 9/2007 | Awano | |
| 2007/0233615 A1 * | 10/2007 | Tumminaro ................... | 705/75 |
| 2008/0098420 A1 | 4/2008 | Khivesara et al. | |
| 2008/0139181 A1 | 6/2008 | Lokshin | |
| 2008/0207296 A1 * | 8/2008 | Lutnick et al. ................. | 463/16 |
| 2008/0244654 A1 | 10/2008 | Angiolillo | |
| 2009/0013347 A1 | 1/2009 | Ahanger et al. | |
| 2009/0150218 A1 * | 6/2009 | Brunner et al. ................ | 705/10 |

(Continued)

OTHER PUBLICATIONS

LBS: Location-Based Services. (Leading Edge) GPS World 13.8 (Aug. 2002): 20(6).*

(Continued)

*Primary Examiner* — Timothy Padot
(74) *Attorney, Agent, or Firm* — Joshua D. Isenberg; JDI Patent

(57) ABSTRACT

Determining whether a commercial transaction has taken place may include a) collecting percipient behavior information from a mobile communication device associated with a percipient, wherein the percipient behavior information is related to behavior of the percipient; b) determining a correlation between the percipient behavior information and transaction behavior information associated with a predetermined commercial transaction; and c) determining from the correlation a confidence level for whether the predetermined commercial transaction has taken place.

16 Claims, 7 Drawing Sheets

(56) References Cited

U.S. PATENT DOCUMENTS

2009/0199107 A1* 8/2009 Lewis et al. .................. 715/745
2009/0288012 A1* 11/2009 Hertel et al. .................. 715/738
2009/0313109 A1* 12/2009 Bous et al. ................. 705/14.31

OTHER PUBLICATIONS

Krygsman, S.C.; Schmitz, P. The use of cellphone technology in activity and travel data collection. In 24th Annual Southern African Transport Conference, SATC 2005: Transport Challenges for 2010, p. 696-705. Document Transformation Technologies cc, Dec. 1, 2005.*

U.S. Appl. No. 12/184,958 entitled "Incentivizing Commerce by Regionally Localized Broadcast Signal in Conjunction With Automatic Feedback or Filtering" filed Aug. 1, 2008.

"ATSC Digital Television Standard Part 1—Digital Television System"—Advanced Television Systems Committee—(A/53, Part 1:2007), Jan. 3, 2007, 22 pages.

"ATSC Digital Television Standard Part 2—RF/Transmission System Characteristics"—Advanced Television Systems Committee—(A/53, Part 2:2007)—Jan. 3, 2007, 44 pages.

"ATSC Digital Television Standard Part 3—Service Multiplex and Transport Subsystem Characteristics"—Advanced Television Systems Committee—(A/53, Part 3, 2007)—Jan. 3, 2007, 27 pages.

ATSC Recommended Practice: Implementation Guidelines for the ATSC Data Broadcast Standard (Doc. A/90)—Advanced Television Systems Committee—Jun. 10, 2001, 122 pages.

ISO/IEC 13818-1:2000 (E), International Standard, "Information technology—Generic Coding of Moving Pictures and Associated Audio Information: Systems", Dec. 1, 2000, 174 pages.

Cell Broadband Engine Architecture, copyright International Business Machines Corporation, Sony Computer Entertainment Incorporated, Toshiba Corporation Aug. 8, 2005 which may be downloaded at http://cell.scei.co.jp/.

PCT International Search Report dated Sep. 1, 2009 for international application No. PCT/US2009/050751.

Office Action dated Nov. 23, 2010 for U.S. Appl. No. 12/184,958, 9 pages.

Office Action dated Aug. 4, 2011 for U.S. Appl. No. 12/184,958.

Non-Final Office Action mailed date Oct. 15, 2012 issued for U.S. Appl. No. 12/184,958.

Final Office Action mailed date Jan. 9, 2012 issued for U.S. Appl. No. 12/184,958.

Final Office Action mailed date May 9, 2011 issued for U.S. Appl. No. 12/184,958.

Non Final Office Action dated May 15, 2013 for U.S. Appl. No. 12/184,958 14 pages.

* cited by examiner

DETERMINING WHETHER A COMMERCIAL TRANSACTION HAS TAKEN PLACE

CROSS-REFERENCE TO A RELATED APPLICATION

This application is related to commonly assigned U.S. patent application Ser. No. 12/184,958, to Ken Miyaki filed the same date as the present application and entitled "INCENTIVIZING COMMERCE BY REGIONALLY LOCALIZED BROADCAST SIGNAL IN CONJUNCTION WITH AUTOMATIC FEEDBACK OR FILTERING", the entire contents of which are incorporated herein by reference.

FIELD OF THE INVENTION

Embodiments of this invention are related to digital broadcasting and more specifically to incentivizing commerce with a regionally localized digital broadcast signal in conjunction with automatic feedback or filtering.

BACKGROUND OF THE INVENTION

Since broadcast television was introduced in the 1930s, television stations and networks have been paid to advertise products and services in conjunction with scheduled programming. Such advertising is often in the form of commercials that are broadcast during breaks in program content. A common problem with such commercials from the point of view of the viewer is that they interrupt the programming that the viewer would like to watch. Another problem with commercials from the point of view of the advertiser is that it is difficult to track the effectiveness of a given advertisement in encouraging a given viewer to purchase something advertised in a commercial.

A major change in the nature of television for both advertisers and consumers arose with the advent of digital television. Introduced in the late 1990s, digital television (DTV) technology appealed to the television broadcasting business and consumer electronics industries as offering new consumer services and business opportunities that were impractical with previous analog television. Digital television is more flexible and efficient than analog television. When properly used by broadcasters, digital television allows higher-quality images and sound and more programming choices than analog does. In DTV moving images and sound are sent and received by means of discrete (digital) signals, in contrast to the analog signals used by analog television. Digital television includes, but is not limited to Digital Terrestrial Television (DTTV or DTT), which is an implementation of digital technology to provide a greater number of channels and/or better quality of picture and sound using aerial broadcasts to a conventional antenna (or aerial) as opposed to a satellite dish or cable connection.

The development of digital television has lead to many changes in television broadcasting and related industries. Many countries have mandated a change from an analog television signal format to a new digital format. One example of such a digital television broadcast standard was developed by the Advanced Television Systems Committee. With a conventional analog television broadcast, a video signal modulates a carrier wave signal that is broadcast by a transmission tower. A television set contains a receiver that detects broadcast signals. The receiver includes a tuner that selects a particular channel according to its carrier frequency and a demodulator that extracts the video signal from the modulated carrier signal. With a digital television signal, the video signal is generated in a digital format or an analog video signal is converted to a digital format to produce a digital signal. The carrier wave is modulated according to the digital signal format, e.g., using vestigial sideband (VSB) modulation. This new format allows data for additional digital services to be broadcast along with a regular television signal. Examples of such services may include real time stock quotes, sports, weather and traffic updates and other services traditionally associated with delivery via two-way media, such as the internet, digital wireless services or cellular telephone services.

Digital broadcasting allows broadcasters to transmit data services unrelated to digital programming content to a wide variety of devices including mobile and handheld devices. The delivery of digital services by a primarily one-way medium through digital broadcast presents certain challenges and problems, particularly when broadcasting to mobile or handheld devices. Utilizing data broadcast over digital television broadcast channels to mobile or handheld devices presents certain problems and opportunities heretofore unrecognized in the art.

It is within this context that embodiments of the present invention arise.

SUMMARY OF THE INVENTION

According to an embodiment of the invention, a method for determining whether a commercial transaction has taken place may comprise:

a) collecting percipient behavior information from a mobile communication device associated with a percipient, wherein the percipient behavior information is related to behavior of the percipient; b) determining a correlation between the percipient behavior information and transaction behavior information associated with a predetermined commercial transaction; and c) determining from the correlation a confidence level for whether the predetermined commercial transaction has taken place.

Collecting percipient behavior information at a) may include generating and transmitting transaction information with the mobile communication device upon completion of a commercial transaction by the percipient. Collecting percipient behavior information may alternatively include generating and transmitting transaction information with a communication device associated with a vendor upon completion of a commercial transaction by the percipient. Collecting percipient behavior information may also include tracking a location of the mobile communication device.

Determining the correlation at b) may include correlating a location of the mobile communication device with a location associated with the predetermined commercial transaction.

Determining the correlation at b) correlating the percipient behavior information to a broadcast of a commercial message associated with the predetermined commercial transaction. For example, the percipient behavior information may be correlated to a time of broadcast of the commercial message or to reception of the commercial message by a broadcast receiving device associated with the percipient or to display of the commercial message by the device.

Determining the correlation at b) may include transmitting the percipient behavior information to a clearinghouse or to a broadcaster of a commercial message associated with the predetermined commercial transaction or to a vendor associated with predetermined commercial transaction.

In some embodiments, the percipient behavior information may include biometric information.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

In accordance with embodiments of the present invention, a digital broadcast signal may be used to facilitate commercial transactions. By way of example, and not by way of limitation, FIG. 1 schematically illustrates an example of digital commerce in accordance with an embodiment of the invention.

Figure 1A:
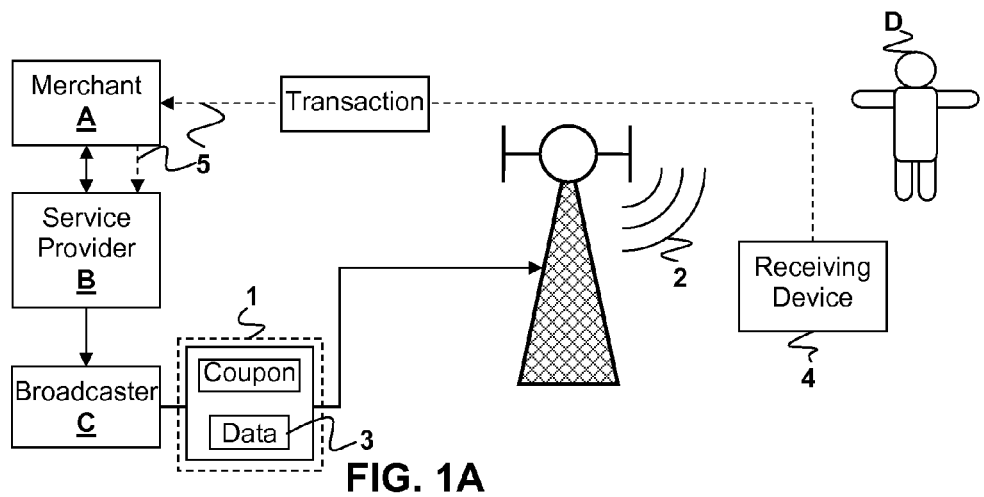
FIG. 1A is a schematic diagram illustrating an example of digital commerce in accordance with an embodiment of the present invention.

Preferably, the digital broadcast signal is of a type that can be received by mobile or handheld (M/H) digital broadcast receiving devices. As illustrated in FIG. 1A, a merchant (e.g., gas station) A may pay service provider B to leverage broadcast assets of broadcaster C. The service provider B prepares and distributes commercial messages 1, which may include advertisements or coupons that may be distributed by a digital broadcast signal 2 generated by broadcaster C. A digital broadcast receiving device 4 receives the digital broadcast signal 2 including the commercial message 1. The receiving device 4 presents information from the commercial message 1 to a user D if a predetermined condition exists. The predetermined conditioned may be selected such that the commercial message 1 is presented when it is most likely to incentivize a percipient D (e.g., the owner or user of the receiving device 4) to engage in a commercial transaction offered by the commercial message 1.

Upon completion of the desired transaction, information regarding the transaction may be reported, e.g., to the service provider B so that the effectiveness of the commercial message in generating a desired response may be determined.

In some embodiments, ancillary data 3 may be associated with the commercial message 1. By way of example, and not by way of limitation, the ancillary data 3 may be used to associate a particular business transaction involving the merchant A with a particular commercial message 1. Examples of ancillary data include, but are not limited to, a message identifier uniquely associated with the commercial message 1, a time at which the message 1 was broadcast, or a particular geographic region in which the message 1 was broadcast.

The ancillary data 3 may be used to generate response information 5, which may be usable to determine the effectiveness of the commercial message in generating a desired response of a percipient D to the commercial message 1. The response information 5 may be transmitted if a commercial transaction associated with the commercial message 1 is completed. The response information 5 may include some or all of the ancillary data 3 and may additionally include information identifying the receiving device 4, and the commercial transaction.

In this example, the merchant A may benefit from percipient D's business driven by the commercial message 1. Furthermore the service Provider B may benefit by getting business from the merchant A to set up ad/coupon service. In addition, the broadcaster C may benefit by selling broadcast bandwidth to the service provider B. The percipient D may benefit from coupon rewards or relevant and timely commercial information.

According to some embodiments, marketing information may be generated by tracking "click through" effectiveness of the commercial message 1. The degree of effectiveness may be used to justify a higher price for the service provider's services.

There are a number of ways to determine the effectiveness of a particular commercial message 1. By way of example and without loss of generality, effectiveness of a commercial message 1 may be measured in terms of the number of commercial messages received, the number that were presented to a percipient, and the number of received messages ultimately acted upon. The service provider B may determine whether a particular message 1 was acted upon if it includes a coupon for a particular transaction at a particular merchant A. The fact that the transaction has taken place may be reported as part of the reporting information 5. For example, if the commercial message includes a coupon, the coupon may have a code or other unique identifier associated with it. This code may be reported electronically either by the merchant A or by the receiving device 4. Effectiveness may be expressed, e.g., as a ratio of a number of messages received to a number of messages acted upon. Alternatively, effectiveness may be measured as a ratio of messages presented to a total number of messages acted upon.

There are a number of ways in which reception and/or presentation of the commercial message may be tracked. For example, the receiving device 4 may include software configured to keep track of commercial messages received, commercial messages that are displayed and commercial messages that are acted upon. This information may be transmitted to the service provider B as part of the reporting information 5.

Figure 1B:
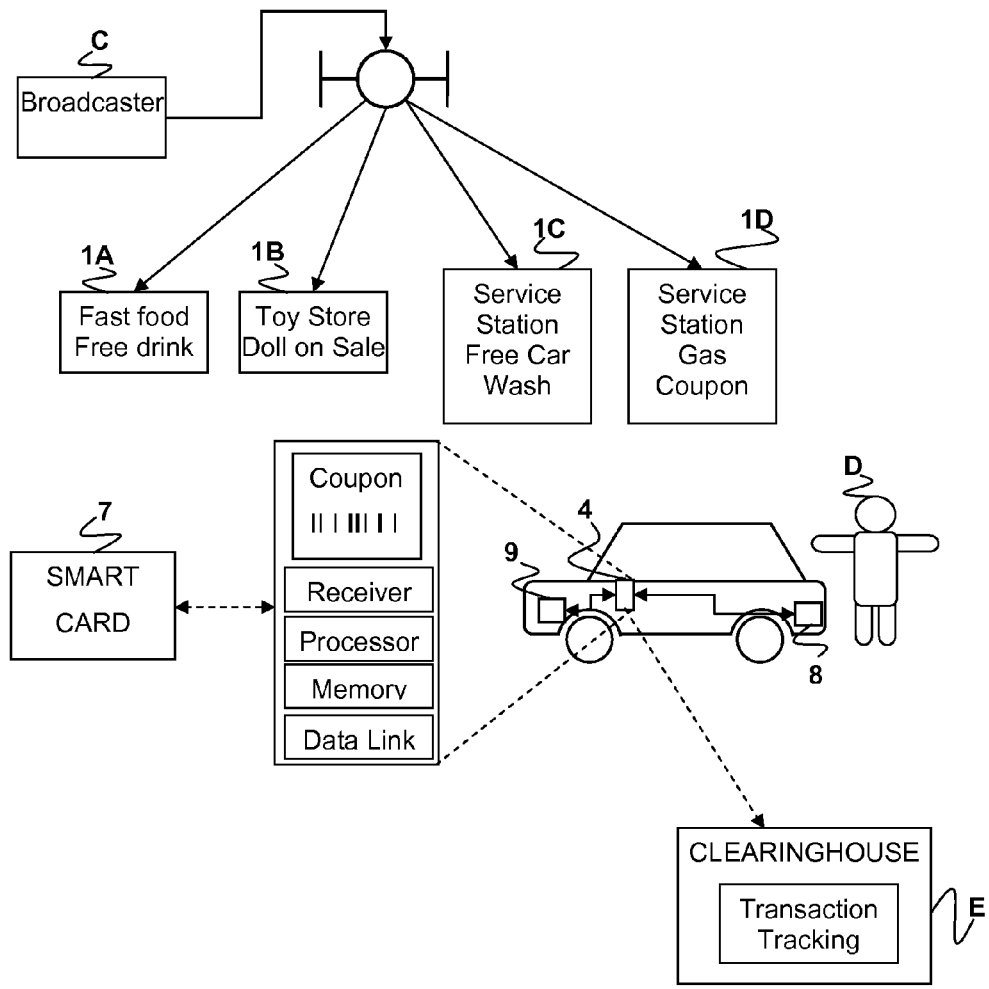
FIG. 1B is a schematic diagram illustrating an example of digital commerce in accordance with another embodiment of the present invention.

FIG. 1B illustrates a more specific example of electronic commerce that may be facilitated by embodiments of the present invention. Broadcaster C distributes a digital broadcast signal 1 including coupons for a fast food free drink 1A, a toy store doll on sale 1B, a service station free car wash 1C, and a service station gas coupon 1D. A receiving device 4 receives these commercial messages 1A-1D, and may present this information to the user if a pre-existing condition exists. By way of example, and not by way of limitation, the receiving device 4 may include a digital receiver to receive digital broadcast signals 1, a processor to decode broadcast signals 1 and process other viable information, a memory to store viable information, and also a data link to temporarily store viable information. Furthermore, a receiving device 4 may be linked to a smart card 7 capable of monitoring and completing transactions related to commercial messages 1A-1B.

These pre-existing conditions can, for example, be met by a filtering system. This filtering system may be controlled by the receiving device manufacturer, who can select some of the filters, such that only commercial messages 1A-1D that meet pre-existing conditions will be presented to the user D. Alternatively, the device percipient D may have some control over the filtering, such that he can decide what criteria must be met for the commercial message 1A-1D to be presented to him. Furthermore, these devices may contain an arrangement that decides which commercial message 1A-1D is presented to the device user when two or more commercial messages 1A-1D meet the filtering criteria simultaneously.

An example of a filtering system that meets pre-existing conditions is a sensor in an automobile that can be used to drive filters that select relevant ads. For example, if the fuel sensor 8 determines that the car is low on gas, the receiving device 4 can select and present ads for local gas stations that incorporate coupons 1D. Similarly, if the oil sensor 9 determines that automobile is in need of an oil change, the receiving device 4 can select and present local ads that incorporate coupons for oil changes.

Filtering systems may be designed to monitor a user's current circumstance, e.g. relevant time, location, gas tank level, etc. and present relevant coupons based on the user's circumstance. Filtering systems may also include validity filters that only present commercial messages 1A-1D up until the time that the coupon associated with the commercial message 1 has expired.

Note that pre-existing conditions need not necessarily be met for a coupon associated with a commercial message 1A-1D to be presented to a user of a receiving device 4. Receiving devices 4 may operate without the addition of a filtering device (null filter), such that all commercial messages 1A-1D whether relevant or irrelevant are presented to the user. An alternative to a filtering system may involve allowing the merchant A or service provider B to receive a user profile that includes the user's age, sex, past consumer behavior, and other user characteristics from the receiving device 4 to better determine what commercial messages 1A-1D to broadcast to the receiving device 4.

Coupons associated with commercial messages 1A-1D and the commercial messages 1A-1D themselves may be displayed in a variety of different manners. They may be presented in the form of a sound byte, HTML, video, etc. Also, the receiving device 4 in the car may be combined with a Bluetooth receiver in a cell phone, allowing the coupon associated with the commercial message 1A-1D to be displayed using a bar code on the cell phone. The merchant A could then control the number of times that this bar code could be used.

Upon completion of the desired transaction, information related to the transaction may be monitored and reported in several different ways. For example, in addition to the tracking mechanisms described in FIG. 1A, the marketing effectiveness may be tracked by an entity entirely independent of the merchant A, service provider B, or broadcaster C, such as a clearinghouse E. The clearinghouse E effectively tracks the transactions and monitors the marketing effectiveness of the commercial messages 1A-1D, allowing for the merchant A, service provider B, or broadcaster C to obtain this information.

Alternatively the effectiveness of a commercial message 1A-1D may be tracked with a cookie in the receiving device 4 that can be used as a coupon for drive-through or click-through. Similarly, a commercial message 1A-1D could be tracked by the receiving device 4 to monitor whether the coupon associated with the commercial message 1A-1D was presented to the user or not.

The effectiveness of a commercial message 1A-1D could also be tracked by having the consumer enter a code associated with the transaction via the receiving device 4 or a device operated by the merchant A in order to report or complete transaction. If no coupon is associated with the commercial message 1A-1D, the effectiveness of the commercial message 1A-1D could be tracked by GPS and other data (e.g., gas tank level) to determine whether ad was acted upon. For example, if the advertisement is for gasoline at a particular gas station, the receiving device could provide information regarding (a) times of reception and presentation of the advertisement at the receiving device 4; (b) geographic location of the receiving device 4 to determine if the user D visited the gas station after the advertisement was displayed; (c); and (d) whether the fuel sensor 8 registered an increase in fuel level while the user D was at the gas station. If the user D visited the gas station after the advertisement was displayed by the receiving device 4 and the fuel sensor 8 registered an increase in fuel level an inference may be drawn that the user bought gas in response to the advertisement.

Lastly, the accounting associated with a redeeming coupon could be decoupled from the transaction incentivized by the coupon or advertisement. This decoupling could mean that the reward for a successful transaction could be given to someone other than the user D or other percipient of the advertisement received by the receiving device 4.

Figure 1C:
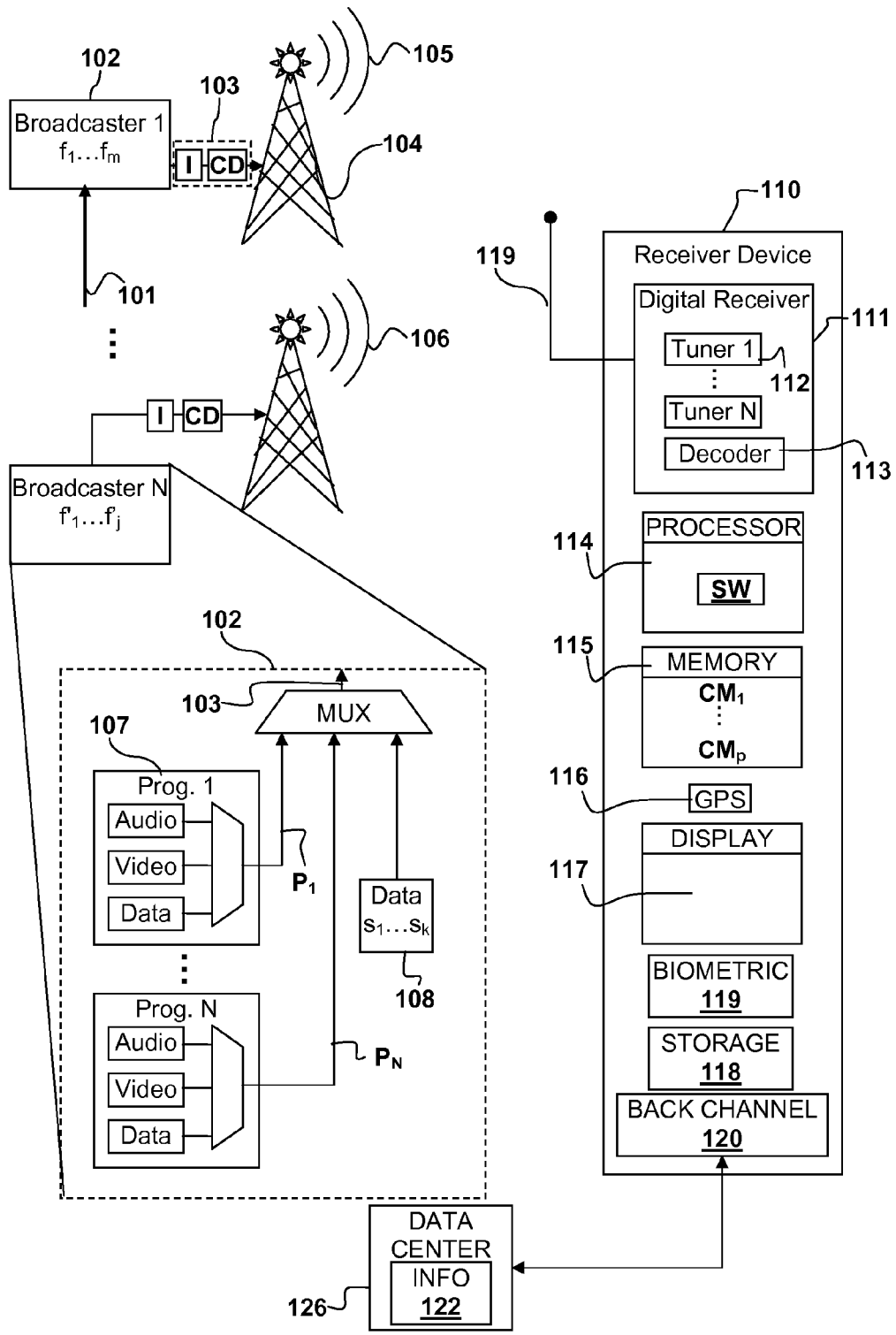
FIG. 1C is a schematic diagram illustrating a broadcast environment in which embodiments of the present invention may be employed.

According to an embodiment of the present invention, a digital broadcast signal may be used to encourage and facilitate commercial transactions. FIG. 1C schematically illustrates a broadcast environment in which embodiments of the present invention may be employed. In such an environment broadcasters 102 receive or generate input data streams 101. The input data streams 101 are converted to digital broadcast data streams 103, which are converted to a digital broadcast signal 105 for reception by digital broadcast receivers 110. It is noted that for the sake of example, the two digital broadcast signals 105, 106 are shown as being transmitted from different towers 104. This is not to be construed as a limitation upon any embodiment of the invention.

Alternatively, the two digital broadcast signals 105, 106 may originate from the same broadcast tower 104 and may be broadcast simultaneously, e.g., using frequency division multiplexing.

By way of example, a digital broadcast signal 105 may be a modulated radiation signal transmitted from a broadcast tower 104, e.g., in the form of an over-the-air broadcast, such as by a radio-frequency electromagnetic wave signal. It is noted that the digital broadcast signal 105 transmitted by a given broadcast tower 104 may include multiple digital broadcast channels modulated at different carrier signal frequencies. Broadcast towers 104 associated with different broadcasters 102 may broadcast over different sets of frequencies. For example Broadcaster 1 may broadcast over a first set of carrier frequencies $f_1 \ldots f_m$ and Broadcaster N may broadcast over a different set of carrier frequencies $f'_1 \ldots f'_j$. There may be some overlap between the two sets of carrier frequencies.

Furthermore, the digital broadcast signal 105 may be transmitted in a form other than an over-the-air broadcast. Alternatively, embodiments of the invention may be used in conjunction with digital broadcasts transmitted over media such as cable (e.g., coaxial cable), optical fiber, or satellite transmission.

By way of example, the digital broadcast signal 105 may be configured in accordance with a digital broadcast standard. Examples of digital broadcast standards include, but are not limited to, the Digital Video Broadcasting (DVB) family of standards maintained in Europe and Australia, the Advanced Television Standards Committee (ATSC) family of standards developed for use in the United States and Canada, the Integrated Services Digital Broadcasting (ISDB) family of standards developed for use in Japan, Digital Multimedia Broadcasting (DMB) standard used in South Korea.

The DVB family of standards includes the DVB-S and DVB-S2 standards for satellite television, the DVB-T and DVB-T2 standards for terrestrial television, DVC-C for cable television and DVB-H for mobile television and other DVB standards which have been or may be developed. The ATSC family of standards includes the ATSC standard for terrestrial television broadcasts and the ATSC M/H standard for broadcasts to mobile and handheld devices. The ISDB family of standards includes the ISDB-S, ISDB-T, and ISDB-C standards, which were developed for satellite, terrestrial and cable television respectively.

By way of example, and not by way of limitation, the digital broadcast signal 105 may be configured according to the ATSC or ATSC-M/H standards. The ATSC standard is described in detail, e.g., in "ATSC Digital Television Standard Part 1—Digital Television System" (A/53, Part 1:2007), "ATSC Digital Television Standard Part 2—RF/Transmission System Characteristics" (A/53, Part 2:2007), and "ATSC Digital Television Standard Part 3—Service Multiplex and Transport Subsystem Characteristics" (A/53, Part 3, 2007), the disclosures of all three of which are incorporated herein by reference. The ATSC Data Broadcast Standard is described, e.g., in (ATSC Recommended Practice: Implementation Guidelines for the ATSC Data Broadcast Standard (Doc. A/90)", which is incorporated herein by reference.

The input data stream 101 may include data streams from multiple sources. For example, within the broadcaster 102 data streams for different television programs 107 may be made up of audio, video and ancillary data streams. These data streams may be multiplexed to form a program data stream $P_1 \ldots P_N$ associated with a given program 107. Multiple program data streams $P_1 \ldots P_N$ may be multiplexed with each other into the broadcast data stream 103. The digital broadcast data stream 103 may include data representing one or more commercial messages CM and ancillary data AD associated with one or more of the commercial messages CM.

Furthermore, one or more data service data streams 108 for broadcast data services $s_1 \ldots s_k$ not specifically associated with a given program 107 may be overlaid (e.g., multiplexed) with the program data streams $P_1 \ldots P_N$ into the broadcast data stream 103.

The data streams 101 that make up the digital broadcast data stream 103 may be subject to data transforms, such as source coding and compression. As used herein, "source coding and compression" refers to bit rate reduction methods, also known as data compression, appropriate for application to the video, audio, and ancillary digital data streams. The term "ancillary data" includes control data, conditional access control data, and data associated with the program audio and video services, such as closed captioning. "Ancillary data" can also refer to independent program services. The broadcast unit 102 may include a coder configured to minimize the number of bits needed to represent the audio and video information. If configured according to the ATSC standard, the broadcaster 102 may employ the MPEG-2 video stream syntax for the coding of video and the Digital Audio Compression (AC-3) Standard for the coding of audio.

The broadcaster 102 may also subject the digital broadcast data stream 103 to service and multiplex transport operations. As used herein, "service multiplex and transport" refers to the means of dividing the digital data stream into "packets" of information, the means of uniquely identifying each packet or packet type, and the appropriate methods of multiplexing video data stream packets, audio data stream packets, and ancillary data stream packets into a single data stream. By way of example, and not by way of limitation, the broadcaster 102 may employ the MPEG-2 transport stream syntax for the packetization and multiplexing of video, audio, and data signals for digital broadcasting systems. Such packetization and multiplexing is described e.g., ISO/IEC 13818-1:2000 (E), International Standard, Information technology—Generic coding of moving pictures and associated audio information: systems", which is incorporated herein by reference.

The digital broadcast data stream 103 may be converted to a digital broadcast signal 105 through processes referred to as channel coding and modulation. The channel coder takes the data bit stream encoded in the digital broadcast data stream 103 and adds additional information that can be used by a receiving device 110 to reconstruct the data from the received signal which, due to transmission impairments, may not accurately represent the transmitted signal 105. A modulation subsystem (or physical layer) uses the digital data stream information to modulate the transmitted signal 105. By way of example and not by way of limitation, in the ATSC standard, the modulation subsystem offers two modes. Both modes are based on vestigial sideband modulation. One mode is a terrestrial broadcast mode known as 8-VSB. The other mode is a high data rate mode known as 16-VSB.

A digital broadcast receiving device 110 receives the digital broadcast signal 105 and extracts the digital broadcast data stream 103 including the images I and control data CD encoded within the digital broadcast signal 105. By way of example, and not by way of limitation, the digital broadcast receiving device 110 may include a digital receiver 111, a processor 114, a memory 115, a display 117, a data storage device 118, and an optional biometric sensor 119. The digital broadcast receiving device 110 may be any type of device capable of receiving and utilizing the digital broadcast signal 105. By way of example, the digital broadcast receiving device 110 may be a digital television set, digital radio receiver, personal computer, laptop computer, a mobile or handheld device such as a cellular telephone, mobile internet device or mobile digital television receiver. Furthermore, the term digital broadcast receiving device encompasses "digital media receivers", GPS devices, game consoles, portable game devices, home, mobile or device security systems, and any combination thereof and including other devices for which the present invention may be coupled to provide command and control.

The digital receiver 111 may include one or more tuners 112 and a decoder 113. The tuner(s) 112 may be coupled to an antenna 119 that receives the digital broadcast signal 105. The tuner 112 selects one or more particular frequencies from among the various signals that are picked up by the antenna 119. The tuner 112 and decoder 113 may extract data and generate audio and video signals from the digital broadcast signal 105. By way of example the tuner 112 and decoder 113 may provide the following functions: demodulation, transport stream demultiplexing, decompression, error correction, analog-to-digital conversion, AV synchronization and media reformatting to fit the specific type of display 117 optimally.

As used herein, demodulation refers to the process of transforming the received digital broadcast signal 105 into a usable signal from which data may be extracted and/or from which quality images and sound may be produced.

Transport Stream Demultiplexing may be implemented, e.g., where multiple digital signals are combined and then transmitted from one antenna source to create over the air broadcasts. In such a case, the decoder 113 may decode the digital broadcast data stream 103 and convert it to a suitable form for display of a particular program with the audio and/or video components or for extraction of a broadcast service data stream 108 from the digital broadcast data stream 103. The decoder 113 may implement decompression if the digital broadcast data stream 103 contains data in compressed form.

The decoder 113 may decompress such data, e.g., by unpacking compressed packets of digital data to their original size. The decoder 113 may also implement Error Correction to make sure that any data that is missing from the received digital broadcast signal 105 can be corrected. For instance, sometimes interference or a poor-quality signal will cause the loss of data information that the tuner 112 receives. In such cases, the decoder 112 may perform a number of checks and repair data so that a signal can be viewed on a TV set or data may be utilized by the processor 114.

The decoder 113 may implement AV Synchronization to coordinate audio and video signals being displayed on the display 117 in proper time. AV synchronization ensures that the audio does not lag behind the video that is being displayed on the display 117 or vice versa, so that both audio and video are in sync. Media reformatting allows the display 117 to properly display video images using the data extracted from the digital broadcast signal 105. Media reformatting is important since the formatting of images on TV sets may differ significantly according to the technology employed. For example, some televisions utilize an interlaced picture, whereas others utilize a progressive-scan picture.

The commercial messages CM may be displayed on the video display 117. By way of example, the display 117 may be any suitable video and/or audio-visual display compatible with the digital broadcast signal 105. By way of example, and not by way of limitation, the display 117 may include a video monitor, such as a cathode ray tube (CRT), plasma display, liquid crystal display (LCD) or organic light-emitting diode (OLED) display. In addition, the display 117 may include one or more devices for generating audio, e.g., one or more speakers.

The processor 114 may be programmed with instructions SW that, when executed, cause the device to a) receive a digital broadcast signal that includes a commercial message CM and ancillary data AD associated with the commercial message; b) present the commercial message CM with the display device 117 if a predetermined condition exists; c) generate response information using the ancillary data AD, the response information may be usable to determine an effectiveness of the commercial message in generating a response of a percipient of the commercial message; and d) transmit the response information if a commercial transaction associated with the commercial message is completed.

The optional biometric sensor 119 may be used to gather biometric information relating to a human, animal or plant affiliated with the receiving device 110. As used herein the term biometric information include information relating to a condition or identifying characteristics of a human, an animal or a plant. Such information may include, but is not limited to, e.g., blood sugar, blood oxygen, or blood alcohol information, body temperature, fingerprints, retinal patterns. By way of example, and not by way of limitation, the receiving device 110 may use such biometric information to identify a user of the device, to monitor a medical condition of the user or to track the user's behavior. Although the biometric sensor 119 is depicted as being part of the device 110 in FIG. 1C, those of skill in the art will appreciate that the biometric sensor may be part of a separate unit that can communicate with the receiving device 110, e.g., over a wired or wireless link.

The receiving device 110 may also implement a backchannel 120 that allows information to be sent from the device to a broadcast unit 102 or a data center 126 affiliated with the broadcast unit. The back channel 120 may be implemented through a digital broadcast signal transmitted from the device 110, e.g., via the antenna 119. Alternatively, the backchannel 120 may be implemented through some other mode of communication such as wireless telephony (e.g., cellular), wireless internet, cable, optical fiber and the like. The back channel 120 may be used to transmit the response information, e.g., to a tracking service or clearing house.

The receiving device 110 may also include a data storage device 118 for non-volatile storage of data, such as selected ancillary information 122. Examples of data storage devices include hard disk drives, flash memories, compact disk (CD) drives, digital video disk (DVD) drives, tape drives, and the like.

The decision to present the commercial message with the display device 117 may be based on one or more filters. By way of example, such filters may filter the decision making process from a geographic perspective based on device position information. To facilitate such functionality, the receiving device 110 may optionally include a position location system 116, such as a GPS receiver. For example, in the case of a mobile or hand-held device, GPS data may be used to filter weather and traffic updates and limit downloads to those that are relevant to the area in which the device is presently located. In some embodiments, the function of the position location system 116 may be implemented by one of the tuners 112 in conjunction with software running on the processor 114. The position location signal may originate from one or more of the towers 104 or a satellite in earth orbit.

Figure 2:
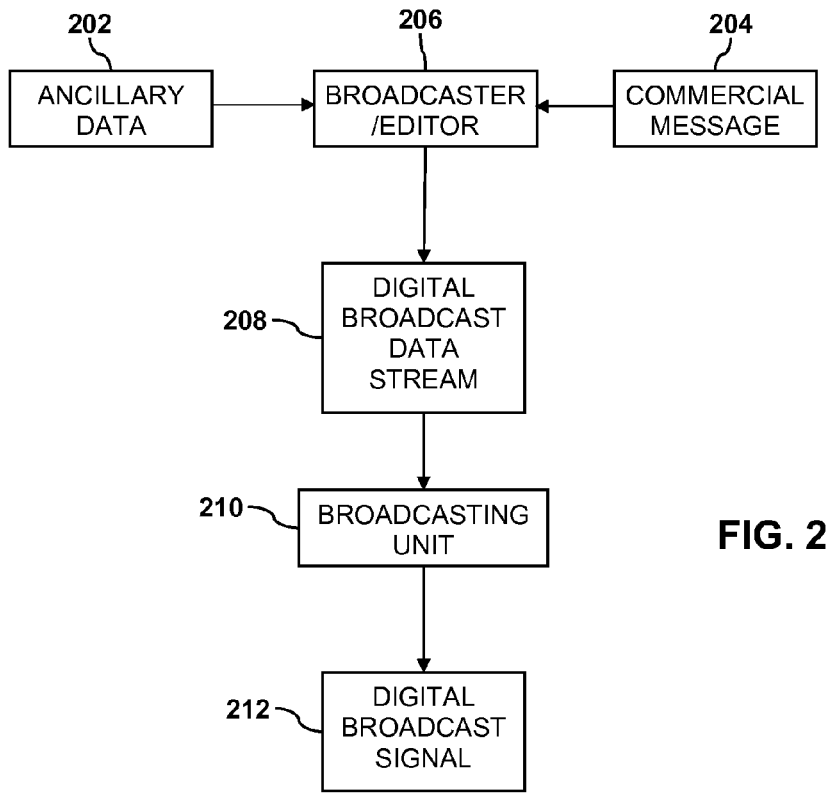
FIG. 2 is a block diagram of a digital broadcast receiving device according to an embodiment of the present invention.

FIG. 2 is a block diagram illustrating a method for providing a digital broadcast data stream having control data 202 associated with a commercial message 204 in a digital broadcast data stream 208 according to an embodiment of the present invention. Digital broadcast signals 212 are formed when input data streams are converted to digital data streams 208, which are fed to a broadcasting unit 210 that converts these digital data streams 208 into digital broadcast signals 212 for transmission to and reception by digital receiving devices. A broadcaster/editor 206 can receive or generate input streams. The input data stream may include data streams from multiple sources. For example, within the broadcaster/editor 206, data streams for different television programs may be made up of audio, video, and ancillary data streams. These data streams may be multiplexed to form a program data stream associated with a given program. Multiple program data streams may be multiplexed with each other to form an input data stream to be received by the broadcaster/editor 206. The input data stream may include data representing one or more commercial messages 204 and ancillary data 202 associated with the commercial message 204.

The input data streams, including the ancillary 202 and commercial message data 204 may be subject to data transforms, such as source coding and compression. The broadcaster/editor 206 may include a coder configured to minimize the number of bits needed to represent this input stream data. If configured according to the ATSC standard, the broadcaster/editor 206 may employ the MPEG-2 video stream syntax for the coding of video and the Digital Audio Compression (AC-3) Standard for the coding of audio.

The broadcasting unit 210 may then subject the digital broadcast data stream 208 to service and multiplex transport operations. Service and multiplex transport refers to the means of dividing the digital data stream into packets of information, the means of uniquely identifying each packet or packet type, and the appropriate methods of multiplexing video data stream packets, audio data stream packets, and ancillary data stream packets into a single data stream. By way of example, and not by way of limitation, broadcasting units 210 may employ the MPEG-2 transport stream syntax for the packetization and multiplexing of video, audio, and data signals.

The digital broadcast data stream 208 may be converted to a digital broadcast signal 212 by the broadcasting unit 210 through processes referred to as channel coding and modulation. The channel coder takes the data bit stream encoded in the digital broadcast data stream 208 and adds additional information that can be used by a receiving device to reconstruct the data from the received signal, which, due to transmission impairments, may not accurately represent the digital broadcast signal 212. A modulation subsystem (or physical layer) uses the digital data stream information to modulate the transmitted signal 105. By way of example, and not by way of limitation, the ATSC standard allows the modulation subsystem to operate in two modes. Both modes are based on vestigial sideband modulation. One mode is a terrestrial broadcast mode known as 8-VSB and the other is a high data rate mode known as 16-VSB.

Figure 3:
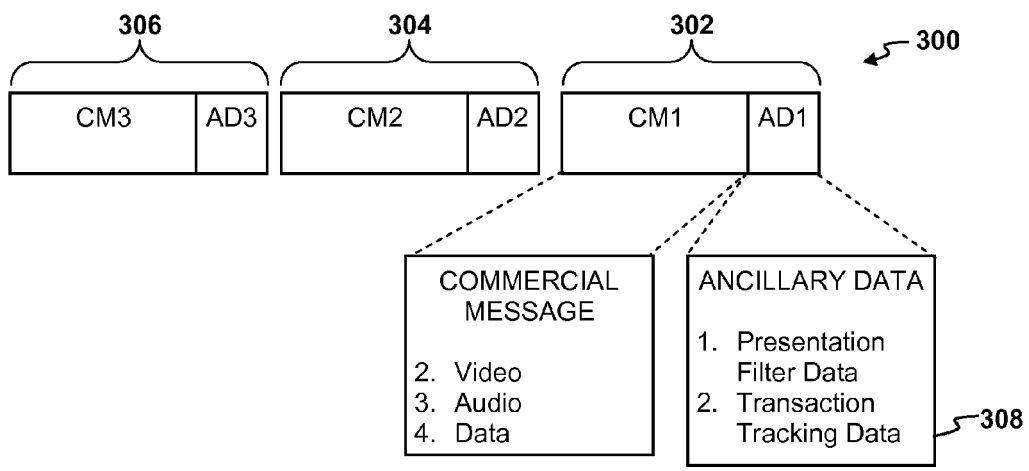
FIG. 3 is a block diagram illustrating generation of a digital broadcast data stream containing commercial messages and ancillary data according to an embodiment of the present invention.

FIG. 3 is a schematic diagram of a digital broadcast data stream that may be used in conjunction with embodiments of the present invention. As seen in FIG. 3 a digital broadcast data stream 300 may include digital data streams 302, 304, 306 containing commercial message packets CM1, CM2, CM3 and corresponding ancillary data packets AD1, AD2, AD3. By way of example, and not by way of limitation, the commercial message packets CM1, CM2, CM3 may include encoded, video, audio images and other relevant data (e.g., text) that is presented by a receiving device. By way of example, and not by way of limitation, the ancillary data packets AD1, AD2, AD3 may include data that is associated with the commercial message, but is not necessarily presented as part of the message. Such ancillary data may include data used by presentation filters, coded instructions for implementing presentation filters, and transaction tracking data usable to track a commercial transaction. Examples of transaction tracking data include unique identifiers associated with the transaction. Such identifiers may be transmitted to the merchant A, service provider B, broadcaster C or clearinghouse E to track the transaction.

Individual commercial message data streams 302, 304, 306 may be combined together in a digital broadcast data stream 300, with other data packets (not shown) containing broadcast programming and broadcast data services. The digital broadcast data stream 300 may be converted into a digital data broadcast signal to be sent by way of a broadcast unit to a receiving device. The receiving device may extract the digital broadcast data stream 300 from the digital broadcast signal and then present or store the information contained in the commercial message packets 302, 304, 306 in the digital as explained above.

Figure 4:
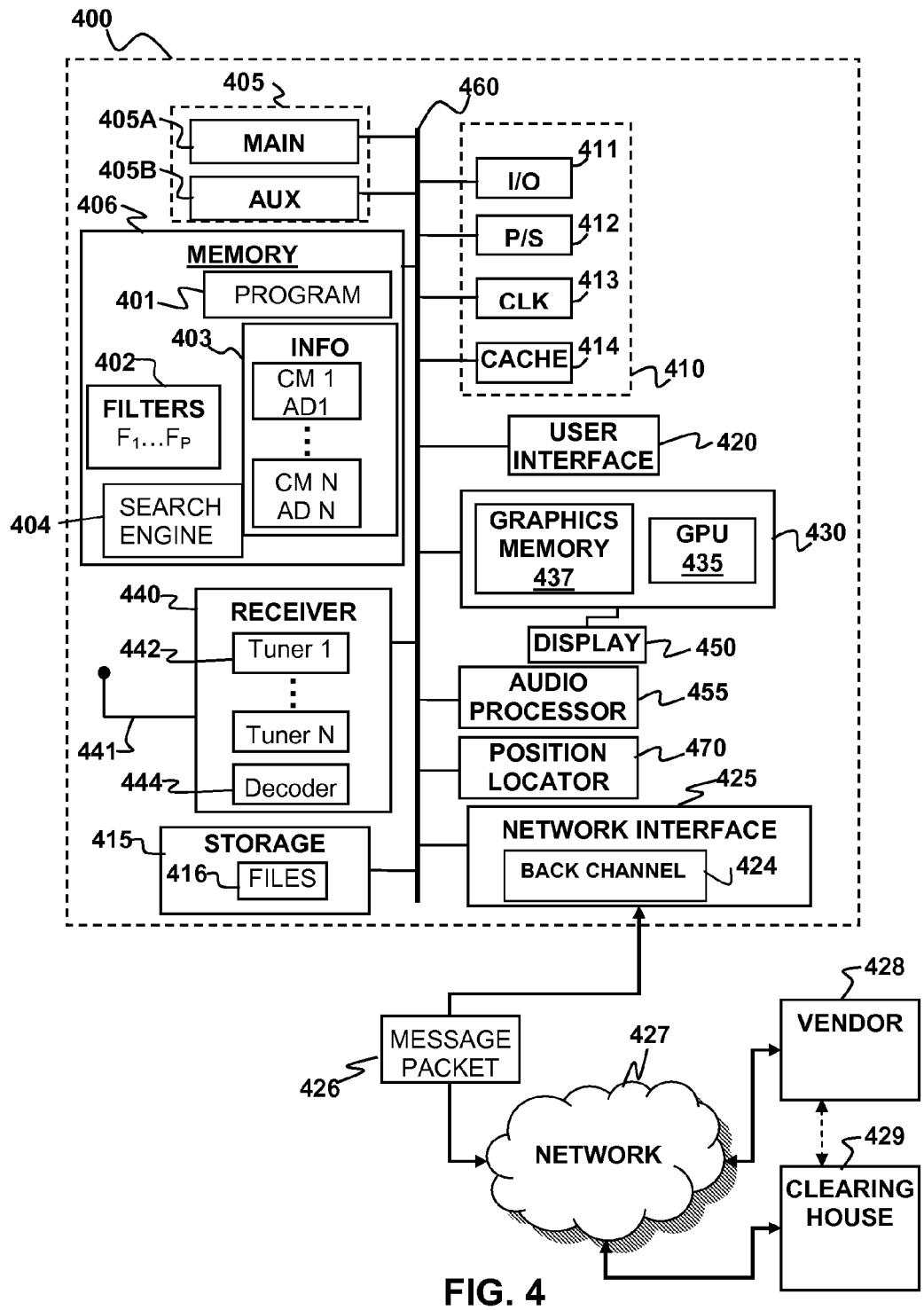
FIG. 4 is a schematic diagram of a digital broadcast data stream that may be used in conjunction with embodiments of the present invention.

By way of example, a digital broadcast receiving device 400 may be configured to implement scheduled updating according to an embodiment of the present invention as shown in FIG. 4. By way of example, and without loss of generality, the receiving device 400 may be implemented as part of a digital television set, personal computer, video game console, personal digital assistant, mobile or handheld device such as a cellular phone or personal digital assistant, portable email device and the like, or other digital device. The device 400 may include a central processing unit (CPU) 405 and a memory 406 coupled to the CPU 405. The CPU 405 may be configured to run software applications and, optionally, an operating system. Some embodiments of the present invention may take advantage of certain types of processor architecture in which the CPU 405 includes a main processor 405A and one or more auxiliary processors 405B. Each auxiliary processor 405B may have its own associated local data storage. One example, among others of such processor architecture is a Cell Processor. An example of Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at cell. scei. co. jp, the entire contents of which are incorporated herein by reference.

Referring again to FIG. 4, the receiving device 400 may also include well-known support functions 410, such as input/output (I/O) elements 411, power supplies (P/S) 412, a clock (CLK) 413 and cache 414. The device 400 may further include a fast data storage device 415 such as a hard disk drive that provides non-volatile storage for applications and data. The fast storage device 415 may be used for temporary or long-term storage of files 416 retrieved from a slower data storage device. By way of example, the storage device 415 may be a fixed disk drive, removable disk drive, flash memory device, tape drive. Alternatively, the storage device 415 may be, e.g., a CD-ROM, DVD-ROM, Blu-ray, HD-DVD, UMD, or other optical storage devices. Files 416 from a slower storage device may be temporarily stored in a faster storage device in a hardware cache for quick loading into the memory 406.

The device 400 may further include a digital broadcast receiver 440 which may be coupled to an antenna 441. One or more digital broadcast tuners 442 may receive digital broadcast signals picked up by the antenna 441. The receiver 440 may further include a decoder 444, which may implement the functions described above.

One or more user input devices 420 may be used to communicate user inputs from one or more users to the system 400. By way of example, one or more of the user input devices 420 may be coupled to the client device 400 via the I/O elements 411. Examples of suitable input devices 420 include keyboards, mice, joysticks, touch pads, touch screens, remote control units, light pens, still or video cameras, and/or microphones.

The memory 406 may store applications and data for use by the CPU 405. The memory 406 may be in the form of an integrated circuit (e.g., RAM, DRAM, ROM, and the like). A computer program 401 may be stored in the memory 406 in the form of instructions that can be executed on the processor 405.

The memory 406 may also store instructions for implementing a search engine 404, e.g., by executing the search engine instructions with the CPU 405. The search engine 404 may be configured, e.g., by suitable programming, to search for particular ancillary data 403 using selected filters 402.

Figure 5:
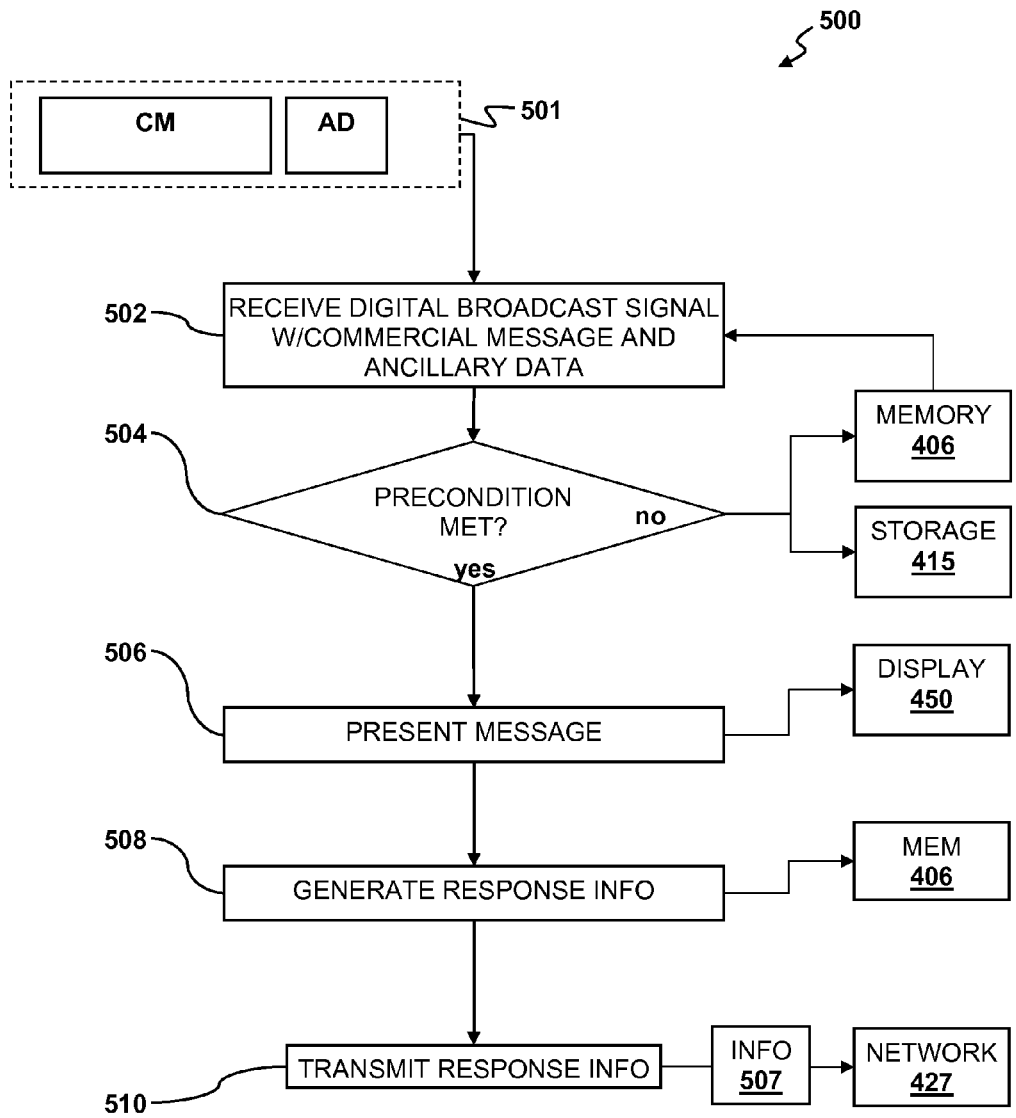
FIG. 5 is a flow diagram illustrating a method for accessing ancillary information associated with an image embedded in a digital broadcast data stream according to an embodiment of the present invention.

The program 401 may include instructions that when executed by the processor cause it to implement a method for digital commerce in conjunction with a digital broadcast. By way of example, and without loss of generality, the program 401 may, upon execution, cause the device 400 to implement the method 500 as illustrated in FIG. 5. Specifically, as indicated at 502, the device may receive a digital broadcast signal 501 that includes a commercial message CM and associated ancillary data AD. As indicated at 504 the program 401 may use the ancillary data AD to determine whether a precondition has been met for presenting the commercial message CM. By way of example, the program 401 may compare information gathered by the device to one or more presentation filters 402 stored in the memory 406 to determine if the condition is met. If the condition is not met, the ancillary data AD may be stored in memory for a later determination and the message CM may be stored in the storage for later presentation. If the condition is present, the commercial message CM may be presented with a display device 450, as indicated at 506.

The presentation filters may be derived from the ancillary data AD. Alternatively, the filter parameters 402 may be established by a user of the device 400 or downloaded from a remote source, e.g. via an electronic communications network 427. By way of example, one or more of the presentation filters 402 may be determined by a manufacturer or distributor of the digital broadcast receiving device 400. Alternatively, one or more of the presentation filters 402 may be determined by a broadcaster of the digital broadcast signal 501.

The filters 402 may include presentation filters based on a time, location, user profile, or input from an ancillary device, such as a smart card or remote processor in communication with the device 400. By way of example a time-based or location-based presentation filter may be configured such that a particular commercial message is presented during a predetermined window of time or when the device 400 is in a predetermined region of space or when the device 400 in a predetermined region of space and within a predetermined window of time.

In some situations, it may be desirable to apply a supplemental filter to arbitrate a presentation hierarchy for two or more commercial messages satisfying a given presentation criteria of a give presentation filter 402.

The program may then generate response information 507, as indicated at 508. The response information 507 is usable to determine an effectiveness of the commercial message in generating a response of a percipient of the commercial message using the ancillary data. Examples of response information may include, but is not limited to information relating to a time of presentation, location of the device 400 at presentation, user-generated filters used to determine presentation, information regarding the device 400, e.g., the type of device and/or information regarding a user of the device 400, e.g., demographic information and past commercial behavior information. The response information 507 may also information usable in tracking a perception of the commercial message CM by the percipient.

As indicated at 510, the device 400 may transmit the response information 507 if a commercial transaction associated with the commercial message is completed. By way, example, as discussed above, the commercial message CM may include a coupon. In such a case, transmission of the response information may include transmitting information indicating redemption of the coupon and, optionally, a time, place and manner of such redemption. The response information 507 may be transmitted to an ancillary device, e.g., a smart card or a remote computer system associated with a vendor or clearinghouse. The remote computer system may process the result information and/or further relay it.

By way of example, after completion of a transaction by the user of the receiving device 400, response information associated with that transaction (e.g., time of purchase, location of purchase, etc.) may be communicated to either a vendor 428 or a clearinghouse 429 in order to determine the effectiveness of the commercial message in generating the desired response. This can be accomplished through the use of a back channel 424 capable of transmitting this desired information. By way of example, the back channel 424 may be implemented through a network interface 425 that facilitates communication via the electronic communications network 427. The network interface 425 may be configured to implement wired or wireless communication over local area networks and wide area networks such as the Internet. The system 400 may send and receive data and/or requests for files via one or more message packets 426 over the network 427. By way of example and not by way of limitation, the electronic communication network 427 may be a local area network, wide area network, or personal area network (e.g., blue-tooth) that can communicate between the device 400 and another device, such as a smart card or processing devices associated with a vendor 428 or a clearinghouse 429. Alternatively, the back channel 424 may be implemented through a digital broadcast signal transmitted from the device via the antenna 441, or through some other mode of communication such as wireless telephony, wireless internet, cable, optical fibers and the like.

By way of example, a message packet 426 containing the result information may be transmitted via the network 427 to a remote processing device associated with the clearinghouse 429, which may use the result information to determine the effectiveness of a commercial message. If the message packet 426 is directly relayed to the clearinghouse 429, then the result information may be quickly processed to determine the effectiveness of the commercial message in generating a desired response. Alternatively, the result information may be relayed with information regarded the completed transaction to a remote processing device associated with the vendor 428 involved in the completed transaction. By way of example, the message packet 426 may be relayed through the network 427 to the vendor 428 at the time of transaction. At this point, the vendor 428 may either process the result information to determine the effectiveness of the commercial message in generating the desired response relay the result information to the clearinghouse 429 for efficient determination of the effectiveness of the commercial message in obtaining a desired result.

The device 400 may further comprise a graphics subsystem 430, which may include a graphics processing unit (GPU) 435 and graphics memory 437. The graphics memory 437 may include a display memory (e.g., a frame buffer) used for storing pixel data for each pixel of an output image. The graphics memory 437 may be integrated in the same device as the GPU 435, connected as a separate device with GPU 435, and/or implemented within the memory 406. Pixel data may be provided to the graphics memory 437 directly from the CPU 405. Alternatively, the graphics unit may receive video signal data extracted from a digital broadcast signal from the decoder 444. Alternatively, the CPU 405 may provide the GPU 435 with data and/or instructions defining the desired output images, from which the GPU 435 may generate the pixel data of one or more output images. The data and/or instructions defining the desired output images may be stored in memory 406 and/or graphics memory 437. In an embodiment, the GPU 435 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 435 may further include one or more programmable execution units capable of executing shader programs.

The graphics subsystem 430 may periodically output pixel data for an image from the graphics memory 437 to be displayed on a video display device 450. The video display device 450 may be any device capable of displaying visual information in response to a signal from the device 400, including CRT, LCD, plasma, and OLED displays that can display text, numerals, graphical symbols or images. The digital broadcast receiving device 400 may provide the display device 450 with a display driving signal in analog or digital form, depending on the type of display device. In addition, the display 450 may be complemented by one or more audio speakers that produce audible or otherwise detectable sounds. To facilitate generation of such sounds, the client device 400 may further include an audio processor 455 adapted to generate analog or digital audio output from instructions and/or data provided by the CPU 405, memory 406, and/or storage 415.

The receiving device 400 may optionally include a position location device 470. Such a device may be based on any suitable technology capable of providing information on the geographic location of a device. Examples of existing technology include global positioning satellite (GPS) technology, inertial guidance technology, and the like. Information from such devices may be used in digital broadcast data applications such as navigation for mobile or hand-held devices.

According to certain embodiments, it may be useful to determine a geographic location of the receiving device 400. Certain digital broadcast services, such as weather and traffic information are local in nature. By way of example and not by way of limitation, a user of a digital receiving device 400 located in, say, a particular locale within the Los Angeles metropolitan area would likely be interested in traffic information for that locale. If such a user is traveling to a destination in a different locale, the user might also be interested in traffic conditions in the vicinity of the destination and along the route to the destination. The digital broadcast signal may include traffic information for several different locales within the Los Angles area. In such a case it may be useful to filter out the traffic information most relevant to the user of the receiving device. To facilitate such filtering, the position-locating device 470 may provide geographic location information that the program 401 may use to generate filters 403 for filtering location-specific relevant information from the digital broadcast signal. Furthermore, in accordance with certain embodiments of the present invention, program 401 may implement a scheduler that may select the digital broadcast channel to which to tune the receiver 440 to receive particular data updates (e.g., traffic or weather data updates) based on the geographic location of the receiving device as determined by the position-locating device 470.

The components of the device 400, including the CPU 405, memory 406, support functions 410, data storage devices 415 user input devices 400, network interface 425, graphics unit 430, audio processor 455 and position location device 470 may be operably connected to each other via one or more data buses 460. These components may be implemented in hardware, software or firmware or some combination of two or more of these.

Figure 6:
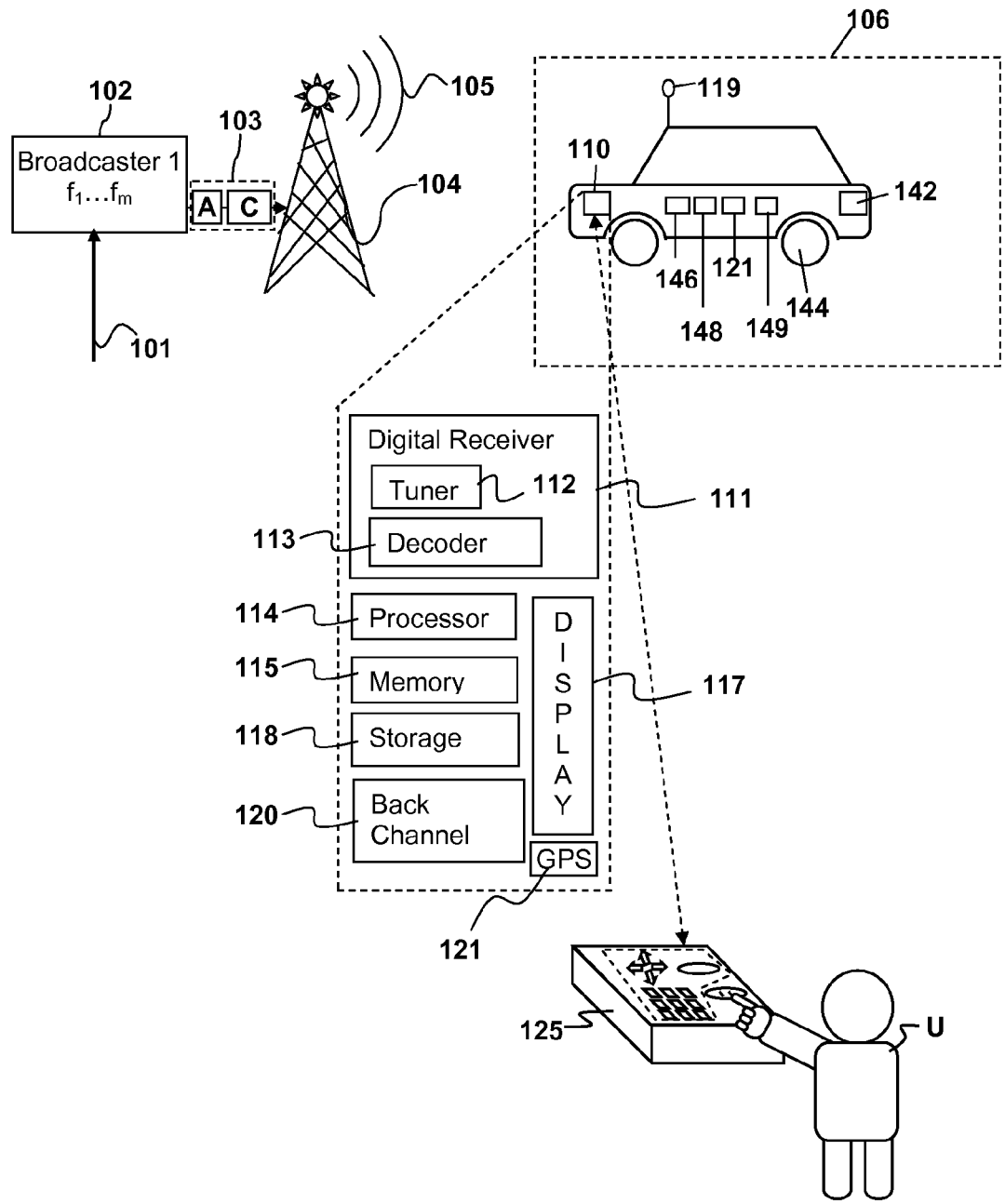
FIG. 6 illustrates an example of accessing ancillary information associated with an image embedded in a digital broadcast data stream according to an embodiment of the present invention.

FIG. 6 schematically illustrates an example of digital commerce in conjunction with a digital broadcast according to an embodiment of the present invention. Initially a broadcaster 102 receives or generates input data streams 101, and converts these input data streams 101 into digital broadcast data streams 103. The input data streams 101 may include data streams from multiple sources, which can be made up of audio, video, and data streams. The digital broadcast data stream 103 may include data representing one or more commercial messages CM and ancillary data A associated with one or more of the one or commercial messages CM. These digital broadcast data streams 103 are converted to a digital broadcast signal 105 by a broadcasting unit 104. The digital broadcast signal 105 is then transmitted to and received by a digital broadcast receiver 110.

The digital broadcast receiving device 110 extracts the digital broadcast data stream 103 including commercial messages CM and ancillary control data A from the digital broadcast signal 105. By way of example, and not by way of limitation, the digital broadcast receiving device 110 may include a digital receiver 111 having a tuner 112 and decoder 113 a processor 114, a memory 115, a display 117, storage device 118, antenna 119, and a back channel 120. These components may be configured as discussed above. The digital broadcast receiving device 110 may be any type of device capable of receiving and utilizing the digital broadcast signal 105, e.g., as described above. In addition, a user U may interact with the device 110 via a user-controlled interface 125 to interact with the receiving device 110. The user U may use the interface 125 to access the digital data streams 103 associated with the digital broadcast signal 105 and also to select certain filtering conditions for the digital receiver 110.

The processor 114 with instructions configured as described above with respect to FIG. 5. The back channel 120 allows for information to a data center 126, which may be affiliated with a clearinghouse, a merchant or the broadcaster 102. Information received at the receiver 110 via the back channel 120 from the digital receiver 110 may be useful in filtering presentation of relevant commercial messages to the user U. Alternatively, information transmitted by the back channel may be useful in calculating the efficiency of commercial messages in the broadcast signal 105 in generating the desired result. In addition, information transmitted via the back channel 120 may be useful in determining whether a predetermined commercial transaction has taken place.

The presentation of commercial messages CM from the digital broadcasting signal 105 may be filtered according to whether one or more predetermined conditions have been met. By way of example filtration of irrelevant commercial messages CM may be based on device position information. To facilitate such functionality, the receiving device 110 may optionally include a position location system such as a GPS receiver 121. Data from the GPS receiver 121 may be used to filter the commercial messages CM and limit presentation to those that are relevant to the area in which the receiving device 110 is presently located. For example, a user of the digital receiving device 110 located in a particular locale within the Los Angeles metropolitan area would likely be interested in goods and/or services (e.g., fuel, food, and lodging) for that locale. If such a user is traveling to a destination in a different locale, the user might also be interested in goods and services available in the vicinity of the destination and along the route to the destination. The commercial messages CM may be relevant for several different locales within the Los Angeles area. In such a case, it may be useful to filter out the commercial messages most relevant to the user U of the receiving device 110. Using data from the GPS receiver 121 to provide geographic location information, the receiving device 110 may filter location-specific relevant information from the commercial messages CM in the digital broadcast signal 105.

Another example of obtaining relevant broadcast data 103 from broadcast signals 105 based on a user's current disposition can come in the form of filtration based on current characteristics of a user's vehicle 106. The receiving device 110 may be linked to several sensors on the vehicle 106 including a fuel sensor 142, a tire pressure sensor 144, an oil sensor 146, a battery sensor 148, a biometric sensor 149, and a location sensor, such as a GPS receiver 121. The fuel sensor 142 monitors the vehicle's fuel level, sending information to the receiving device 110 indicating any changes in the vehicle's fuel level. The tire pressure sensor 144 may monitor the tire pressure of the vehicle 106, sending information to the receiving device 110 indicating any changes in the vehicle's tire pressure. The oil sensor 146 may monitor the oil level of the vehicle 106, sending information to the receiving device 110 indicating any changes in the vehicle's oil level. The battery sensor 148 similarly monitor charge level of the battery of the vehicle 106, sending information to the receiving device 110 indicating any changes in the vehicle's battery charge. The biometric sensor 149 may sense biometric information relating to the vehicle 106 or its occupants. As used herein the term biometric information include information relating to a condition or identifying characteristics of a human, an animal or a plant. Such information may include, but is not limited to, e.g., blood sugar, blood oxygen, or blood alcohol information, body temperature, fingerprints, retinal patterns.

The receiving device 110 can be configured to filter the broadcast signals 105 coming in using the information it has received from the various sensors that are linked between the vehicle 106 and the receiving device 110. By way of example, when the vehicle's gas or tire pressure is low, commercial messages CM that convey information about local gas stations or include coupons affiliated with local gas stations may be selected, extracted, and presented to the user U on the display 117.

By using information from the vehicle 106, user U, and receiving device 110 for presentation filtering, the commercial messages CM that are ultimately selected, extracted, and presented to the user U may be optimized such that the user receives the most relevant information at all times.

When a commercial message has been displayed, the device 110 may send response information to the data center 126 regarding the display of the commercial message. Once the data center 126 is aware of the presentation of a particular commercial message, it is desirable to determine whether a commercial transaction has taken place in response to the commercial message. If the transaction involves a form of digital commerce that directly involves the receiving device 110 such reporting may be easily accomplished. For example, if the commercial message includes a digital coupon, redemption of the digital coupon at a particular vendor location may be reported by the receiving device 110 or by the vendor.

In certain embodiments of the present invention it may useful to determine whether a commercial transaction has taken place in the absence of such direct reporting. For example, some vendors might not have the necessary equipment for reporting the transaction and some digital broadcast receiving devices may not be capable of transmitting the transaction information or a user might not want to transmit it.

Figure 7:
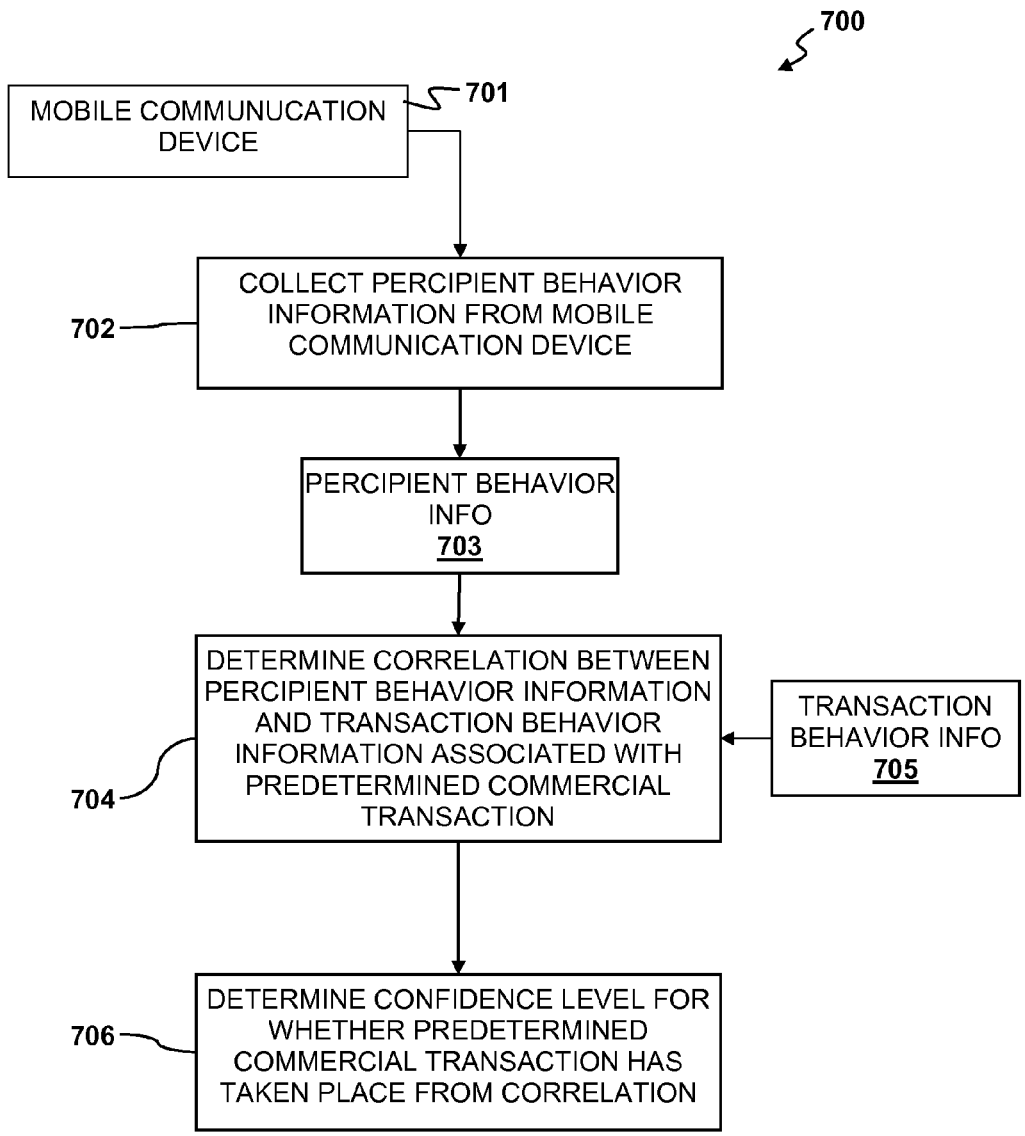
FIG. 7 is a flow diagram illustrating a method for determining whether a commercial transaction has taken place according to an embodiment of the present invention.

In such cases it is possible to determine whether a commercial transaction has taken place as shown in FIG. 7. Such a method may be implemented by a data center, which may be associated with a merchant, service provider, broadcaster or clearing house as discussed above. As illustrated in FIG. 7, a method 700 for determining whether a commercial transaction has taken place may begin with the collection of percipient behavior information 703 from a mobile communication device 701 associated with a percipient, as indicated at 702. The percipient behavior information 703 is related to behavior of the percipient. More specifically, the behavior information 703 is information of a type that can be used to deduce whether a predetermined commercial transaction has taken place.

By way of example, the percipient behavior information may be collected at 702 through includes generation and transmission of transaction information with the mobile communication device 701 upon completion of a commercial transaction by the percipient. Examples of generation and transmission of transaction information are discussed in detail above. Alternatively, the transaction information may be generated and transmitted by a communication device, e.g., a computer system, associated with a vendor upon completion of the commercial transaction by the percipient. For example, commercial credit card transactions may be communicated to a credit card company by an electronic transaction system at a vendor's commercial establishment in a conventional manner. The credit card company may also receive payments for a percipient's cellular phone bill. The credit card company may therefore deduce an association between the credit card transaction with the percipient's cellular phone.

It is not necessary, and often not possible, to track every transaction a percipient makes. For example, some transactions may be straight cash transactions not involving credit cards, coupons or other ancillary data that can be used to track the transaction. Fortunately, there are a number of other examples of percipient behavior that can be obtained from a mobile communication device and used to track percipient behavior. For example, many mobile communication devices, such as cell phones include some geographic tracking capability. This tracking capability may involve a dedicated position location device (e.g., GPS system) embedded within the communication device. Alternatively, the tracking capability may arise from the nature of communication with the device. Specifically, in the case of cellular telephones, a cellular network may track which cell tower is used for a particular telephone call. If the geographic location information has sufficient resolution with respect to both time and space it is possible to determine whether a percipient visited a particular vendor location and how long he stayed there.

Other types of information that can be correlated to commercial activity may also be collected as part of the percipient behavior information 703. For example, the mobile communication device 701 may be configured to measure biometric information. By way of example, the communication device may include a biometric sensor or may communicate with another device that includes a biometric sensor. As used herein the term biometric information include information about the state, condition or identifying characteristics of a human, animal or plant. Such information may include, but is not limited to, e.g., blood sugar, blood oxygen, or blood alcohol information, body temperature, fingerprints, retinal patterns. By way of example and not by way of limitation blood sugar and/or blood alcohol information may be used to track food and/or alcohol consumption by the percipient. A change in blood sugar and/or blood alcohol may be correlated to geographic information, such as whether the device 701 or the percipient is located at an eating or drinking establishment.

Once the percipient behavior information 703 has been collected a correlation may be determined between the percipient behavior information 703 and transaction behavior information 705 associated with a predetermined commercial transaction as indicated at 704. Examples of transaction behavior information include, but are not limited to, a location of a transaction, the specific merchant involved in the transaction, the time at which the transaction took place, the nature of goods or services exchanged in the transaction, the amount of money exchanged in the transaction, and the like.

Determining the correlation at b) may include correlating a location of the mobile communication device with a location associated with the predetermined commercial transaction.

Determining the correlation at 704 may involve correlating the percipient behavior information to a broadcast of a commercial message associated with the predetermined commercial transaction. For example, the percipient behavior information may be correlated to a time of broadcast of the commercial message or to reception of the commercial message by a broadcast receiving device associated with the percipient or to display of the commercial message by the device.

In some embodiments, the percipient behavior information 703 may be transmitted to a data center. The data center may be associated with a broadcaster of a commercial message associated with the predetermined commercial transaction or with a vendor associated with predetermined commercial transaction for calculation of the correlation or with a clearinghouse.

There are a number of ways to correlate such information to the percipient behavior information 703. For example, suppose the existence of commercial transactions associated with a particular communication device 701 may generally be deduced from the percipient behavior information 703, e.g., credit card or debit card transaction information, generated either by the device 701, a merchant or a third party such as a bank or credit card company. Such card transaction information for the percipients transactions made with the card may be compared against corresponding information for the predetermined transaction. Suppose that the predetermined information involved the purchase of particular groceries from a particular grocery store chain during a particular period of time. This information may be compared against the percipient's credit card transaction information, and or user device location for the same period of time to determine if there is a sufficient match between the details of any of the percipient's transactions during the relevant time period and the details of the predetermined transaction. A correlation may be determined based on the number of details that match.

By way of example, and not by way of limitation, a correlation score for a predetermined transaction involving a particular time frame, merchant, location and goods may be determined according to TABLE I below:

TABLE I

| TRANS-ACTION | DETAIL | | | | SCORE |
|---|---|---|---|---|---|
| | TIME (0.4) | LOCATION (0.2) | MERCHANT (WEIGHT) (0.2) | GOODS (0.2) | |
| 1 | NO | YES | YES | YES | 0.6 |
| 2 | NO | NO | YES | YES | 0.4 |
| 3 | YES | YES | YES | NO | 0.8 |
| 4 | YES | YES | YES | YES | 1.0 |

In this Example, each detail of a predetermined transaction is accorded a weight. The weights may be assigned based on their relative importance to the transaction. For example, the time of a transaction may be very relevant if it is desired to determine if a predetermined transaction took place as a result of an advertisement broadcast at a particular time. Percipient transactions taking place before the advertisement was broadcast may be irrelevant and the correlation score for such transactions may be set to zero. Any mathematical formula may be used to calculate the correlation score from the weights.

As the simple example illustrated in TABLE I, if a particular detail for the predetermined transaction is present for a particular one of percipient's transactions 1, 2, 3, and 4 the amount of the weight for that detail may be added to the correlation score for that particular transaction.

Once the correlation has been determined, the correlation may be used to determine a confidence level for whether the predetermined commercial transaction has taken place, as indicated at 706. The confidence level may take into account the fact that, statistically, a percipient's observed behavior may sometimes generate a false positive. For example, certain behavior may be related to factors other than a commercial transaction. Take the case of a percipient whose device is tracked to a particular gas station and remains there for a sufficient period of time to purchase fuel. Although this might suggest that the percipient purchased fuel, other explanations for this behavior are possible. For example, the percipient may have stopped at the gas station to put air in the tires of his vehicle, ask for directions, or use the restroom. In such a case it may be desirable to modify the correlation score for this transaction by taking into account these other possibilities. Specifically, statistics may be measured or deduced for these other explanations and a confidence level may be assigned to the correlation based on these statistics.

The confidence level may depend on the number and nature of matching details. For example, in the preceding example, a moderate confidence level may be assigned to the likelihood that a predetermined fuel sale took place. However, if additional information is obtained, e.g., from the fuel level sensor 142 of the vehicle 106 in FIG. 6 the confidence level may change dramatically. For example, an increase in fuel level while the car 106 is at the gas station would imply with high confidence that a fuel sale took place. Furthermore, if no change in the fuel level took place, a very low confidence may be established. It is noted that additional information regarding the percipient's activity at the gas station may be deduced from behavioral information obtained from the tire pressure sensor 144, oil sensor 146, battery sensor 148 and biometric sensor 149.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A computer-implemented method for determining whether a predetermined commercial transaction has taken place by a data center, the method comprising:
   a) collecting percipient behavior information from a mobile communication device associated with a percipient, the collection of the percipient behavior information being made by a processing device at the data center,
   wherein the percipient behavior information is related to behavior of the percipient and includes a location of the percipient or a location of the mobile communication device, and
   wherein collecting the percipient information includes collecting, by at least one biometric sensor, biometric information about a state or condition of the percipient;
   b) comparing the percipient behavior information to transaction behavior information associated with the predetermined commercial transaction, and based on the comparing, determining a correlation score between details of the percipient behavior information and corresponding details of the predetermined commercial transaction, the determination of the correlation score being made by the processing device at the data center,
      wherein each of the details of the predetermined commercial transaction has an assigned weight based on its relative importance to the predetermined commercial transaction, and
      wherein determining the correlation score between the details includes determining a correlation between the location of the percipient or the location of the mobile communication device and a location associated with the predetermined transaction, determining a correlation between the state or condition of the percipient and a corresponding state or condition associated with the predetermined commercial transaction, and calculating the correlation score with a weighted mathematical formula based on the assigned weights; and
   c) determining from the correlation score a confidence level for whether the predetermined commercial transaction was completed by the percipient, the determination of the confidence level being made by the processing device at the data center.

2. The method of claim 1, wherein collecting the percipient information in a) includes collecting transaction information generated and transmitted with the mobile communication device upon completion of a commercial transaction by the percipient.

3. The method of claim 1, wherein a) further includes collecting percipient information from a communication device associated with a vendor, wherein collecting the percipient information from the communication device associated with the vendor includes collecting transaction information generated and transmitted with the communication device associated with the vendor upon completion of a commercial transaction by the percipient.

4. The method of claim 1, wherein collecting the percipient information in a) includes tracking the location of the mobile communication device.

5. The method of claim 4, wherein determining the correlation score in b) includes correlating the location of the mobile communication device with the location associated with the predetermined commercial transaction.

6. The method of claim 1, wherein determining the correlation score in b) includes correlating the percipient behavior information to a broadcast of a commercial message associated with the predetermined commercial transaction.

7. The method of claim 6, wherein correlating the percipient behavior information to the broadcast of the commercial message includes correlating the percipient behavior information to a time of broadcast of the commercial message.

8. The method of claim 6, wherein correlating the percipient behavior information to the broadcast of the commercial message includes correlating the percipient behavior information to reception of the commercial message by a broadcast receiving device associated with the percipient.

9. The method of claim 6, wherein correlating the percipient behavior information to the broadcast of the commercial message includes correlating the percipient behavior information to display of the commercial message, wherein the display is by the mobile communication device.

10. The method of claim 1, wherein b) includes transmitting the percipient behavior information to a clearinghouse.

11. The method of claim 1, wherein b) includes transmitting the percipient behavior information to a broadcaster of a commercial message associated with the predetermined completed commercial transaction.

12. The method of claim 1, wherein b) includes transmitting the percipient behavior information to a vendor associated with the predetermined completed commercial transaction.

13. The method of claim 1, further comprising determining an effectiveness of a commercial message associated with the predetermined commercial transaction based on the confidence level and adjusting a price for advertising services associated with the predetermined commercial transaction according to the effectiveness that is determined.

14. The method of claim 1, wherein the determining the correlation score between the details includes determining how many of the details of the percipient behavior information match the corresponding details of the predetermined commercial transaction.

15. A non-transitory computer-readable medium having embodied therein computer executable instructions for implementing a method for determining whether a predetermined commercial transaction has taken place by a data center, the method comprising:
   a) collecting percipient behavior information from a mobile communication device associated with a percipient, the collection of the percipient behavior information being made by a processing device at the data center,
      wherein the percipient behavior information is related to behavior of the percipient and includes a location of the percipient or a location of the mobile communication device, and
   wherein collecting the percipient information includes collecting, by at least one biometric sensor, biometric information about a state or condition of the percipient;
   b) comparing the percipient behavior information to transaction behavior information associated with the predetermined commercial transaction, and based on the comparing, determining correlation score between details of the percipient behavior information and corresponding details of the predetermined commercial transaction, the determination of the correlation score being made by the processing device at the data center,
  wherein each of the details of the predetermined commercial transaction has an assigned weight based on its relative importance to the predetermined commercial transaction, and
  wherein determining the correlation score between the details includes determining a correlation between the location of the percipient or the location of the mobile communication device and a location associated with the predetermined transaction, determining a correlation between the state or condition of the percipient and a corresponding state or condition associated with the predetermined commercial transaction, and calculating the correlation score with a weighted mathematical formula based on the assigned weights; and
c) determining from the correlation score a confidence level for whether the predetermined commercial transaction was completed by the percipient, the determination of the confidence level being made by the processing device at the data center.

16. A computer apparatus, comprising,
a processor;
a memory coupled to the processor; and
instructions embodied in the memory and executable by the processor, the instructions being configured to implement a method for determining whether a predetermined commercial transaction has taken place by a data center when executed by the processor, the method comprising:
a) collecting percipient behavior information from a mobile communication device associated with a percipient, the collection of the percipient behavior information being made by a processing device at the data center,
  wherein the percipient behavior information is related to behavior of the percipient and includes a location of the percipient or a location of the mobile communication device, and
  wherein collecting the percipient information includes collecting, by at least one biometric sensor, biometric information about a state or condition of the percipient;
b) comparing the percipient behavior information to transaction behavior information associated with the predetermined commercial transaction, and based on the comparing, determining a correlation score between details of the percipient behavior information and corresponding details of the predetermined commercial transaction, the determination of the correlation score being made by the processing device at the data center,
  wherein each of the details of the predetermined commercial transaction has an assigned weight based on its relative importance to the predetermined commercial transaction, and
  wherein determining the correlation score between the details includes determining a correlation between the location of the percipient or the location of the mobile communication device and a location associated with the predetermined transaction, determining a correlation between the state or condition of the percipient and a corresponding state or condition associated with the predetermined commercial transaction, and calculating the correlation score with a weighted mathematical formula based on the assigned weights; and
c) determining from the correlation score a confidence level for whether the predetermined commercial transaction was completed by the percipient, the determination of the confidence level being made by the processing device at the data center.

* * * * *